(No Model.)
2 Sheets—Sheet 1.
H. J. CASE.
HARVESTER REEL.
No. 307,911. Patented Nov. 11, 1884.
Fig., 1.
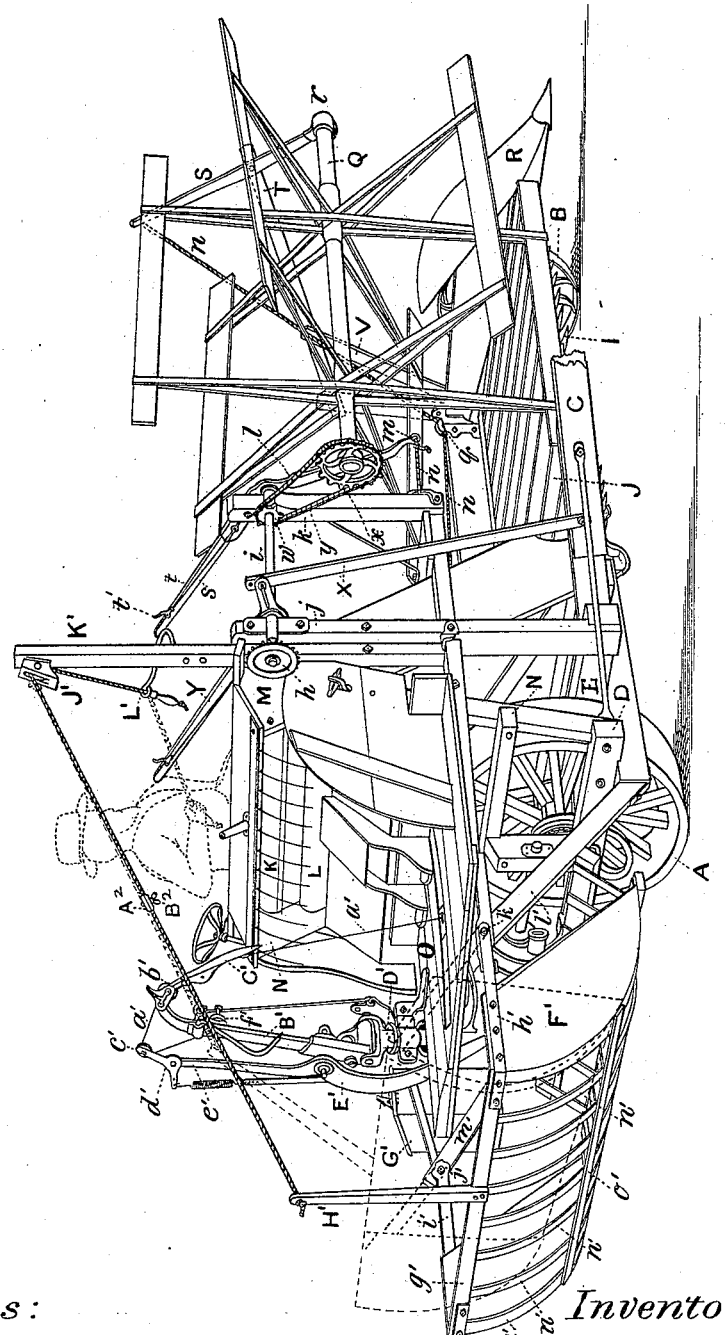
Witnesses:
Reg Smith
W. E. Chaffee
Inventor:
Henry J. Case,
by A. M. Smith,
Attorney.

(No Model.)
H. J. CASE.
HARVESTER REEL.
No. 307,911.　　　　　　　Patented Nov. 11, 1884.
2 Sheets—Sheet 2.
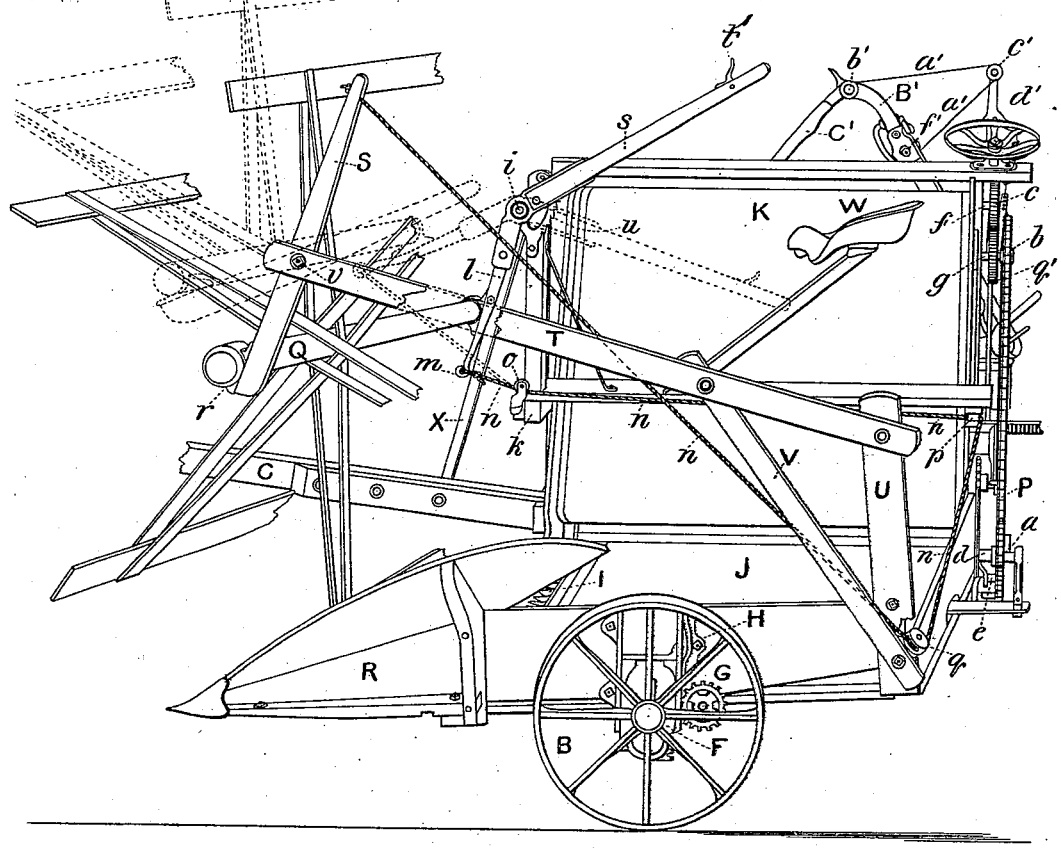
Fig., 2.
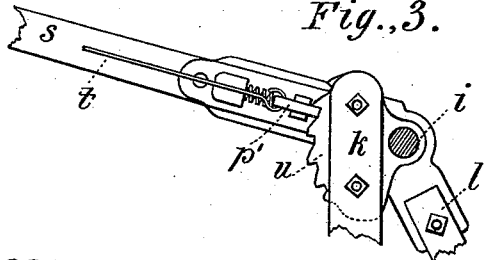
Fig., 3.
Witnesses:
Rex. Smith
W. E. Chaffee
Inventor:
Henry J. Case,
by A. M. Smith,
Attorney.

UNITED STATES PATENT OFFICE.

HENRY J. CASE, OF AUBURN, NEW YORK, ASSIGNOR OF ONE-HALF TO DAVID M. OSBORNE, OF SAME PLACE.

HARVESTER-REEL.

SPECIFICATION forming part of Letters Patent No. 307,911, dated November 11, 1884.

Application filed November 13, 1882. (No model.)

*To all whom it may concern:*

Be it known that I, HENRY J. CASE, a citizen of the United States, residing in the city of Auburn, county of Cayuga, State of New York, have invented new and useful Improvements in Harvester-Reels, of which the following is a full, clear, and exact description, reference being had to the accompanying drawings, making part of this specification, in which—

Figure 1 is a perspective view of a harvester with my improvements attached. Fig. 2 is a perspective view of the same, looking at the harvester from the grain side of the machine; and Fig. 3 is a detail view of the lever-dog and sector-plate, hereinafter referred to.

The same letters of reference in the different figures indicate like parts of the machine.

My invention consists in the application of a reel to the harvester in such a manner that while supported at both ends it may be raised and lowered at pleasure by the driver in his seat without changing the supports or mechanism for driving the reel. These improvements are applied to a harvester very similar in construction to those largely in use, and the same will only be so far described as is necessary to a clear understanding of the improvements, their mode of application, and operation in connection with this particular machine, as they may be effectually applied to other machines of a different construction.

In the drawings, A represents the ground or driving wheel; B, the grain-wheel at the outer side of the machine, and C the pole for the attachment of the team. On the two wheels are supported the frame-work and operating devices of the whole machine, the pole, by means of the team, keeping the machine in proper working position. The beams D and E are mounted on the axle of the drive-wheel A by means of brackets, so that they can be raised or lowered thereon for setting the cutting apparatus at different heights, the grain-wheel B being also adjustable by means of its slide F, having teeth on its edge, operated by a pinion, G, worked by a removable hand-lever, and held where adjusted by a pawl, H. By the beams D and E the frame-work is mainly supported. The cutting apparatus I consists of the ordinary finger-bar with slotted guard-fingers and scalloped cutter, and is arranged in the usual position. It has in rear of it an endless apron, J, supported at both ends by rollers so arranged and driven as to move the upper surface of the apron from the grain side of the machine toward the drive-wheel A. Two endless elevator-aprons, K and L, are supported in frame-work M N, and are inclined, so as to receive the grain between them from the apron J and deliver it to the binding-platform O outside of the main driving-wheel. The elevating and carrying aprons derive their motion from the driving-wheel A through an endless chain, P, passing over a sprocket-wheel, $a$, on the crank-shaft $d$, which shaft is driven by gearing on the drive-wheel. Said chain also passes around a similar sprocket-wheel on the shaft $e$ of the driving-roller of the carrying-apron J, and around a sprocket-wheel, $b$, on the shaft $g$ of the lower elevating-apron roller. The upper roller on the shaft $f$ is driven by a gear, $q'$, on the shaft $g$, meshing with one, $c$, of the same size on the shaft $f$. On the opposite end of the shaft $f$ is fastened a bevel-pinion hidden in Fig. 1 by the bevel-wheel $h$ on the shaft $i$ gearing with it. This shaft $i$ is supported in bearings in the posts $j$ and $k$.

On the shaft $i$, outside of the post $k$, is journaled an arm or lever, $l$, which projects forward and downward and has a bearing for one end of the reel-shaft Q, beyond which and at the extreme end of the lever is an eye, $m$, to which is fastened one end of a cord, $n$, which passes under a sheave, $o$, at the foot of the post $k$, thence across the machine and around a sheave, $p$, thence along the rear of the machine and downward around a sheave, $q$, fastened to the corner of the machine behind the divider R, and thence across and upward to a lever, S, to one end of which it is fastened. This lever S is pivoted about midway of its length to the forward end of the long arm T, the arm being broken away in Fig. 2 to show the lever $l$ and the inner bearing of the reel-shaft. This arm T is supported by a post, U, and brace V, to which it is bolted, the bottoms of the brace and post being bolted to the corner of the machine. The forward or lower end of the lever S is provided with a box or bearing in which the reel-shaft Q revolves. To the lever $l$ is fastened a lever, $s$, which has a locking-dog, $p'$, controlled by the rod $t$ and thumb-lever $t'$, which dog locks with the notched sector-plate $u$, bolted to the post $k$ in proper position.

In machines of a moderate width of cutting apparatus the reel can be and is supported without difficulty on bearings arranged at one end of the reel only, and are known as "overhung reels;" but in machines of wide cut, like most harvesters of the present day, in which the cutting apparatus is eight feet, and in some cases ten feet, wide, it is difficult to overhang and support a reel of this class without making it too heavy and cumbrous to be readily raised and lowered. In this machine it will be seen that through the lever $s$ the driver in his seat W on the machine can at pleasure raise or lower the reel, it being supported in all its different heights on its bearings at both ends of its shaft. This, it will be seen, is due to the fact that the pivot-points of the supporting-levers $l$ and S coincide, and their axes are in line with and parallel to the cutting apparatus, that the bearings for the opposite ends of the reel-shaft are at the same distance from the pivots of the levers $l$ and S, and that the cord end of the lever S, and the eye $m$ of the lever $l$, to which the other end of the cord $n$ is fastened, are at equal distances from their respective fulcrum-points, the shaft $i$, and pivot $v$. The operator, by taking hold of the lever $s$ and releasing it by means of the thumb-lever $t'$, can, by bearing down on the lever, raise the reel, as shown in dotted lines, and again lower it, as shown in full lines. The movement of the eye end of the lever $l$ causes a corresponding movement of the lever S at its upper end in the reverse direction through the action of the cord $n$, connecting the two together, and it can be locked and held in any desired position.

On the shaft $i$, inside of the post $k$, is fastened a sprocket-wheel, $w$, and another, $x$, of larger size is fastened to the inner end of the reel-shaft Q. A square-linked chain, $y$, connects the two together and imparts rotation to the reel from the shaft $i$, bevel-wheel $h$, and its pinion, and the devices heretofore described connecting the roller of the elevating-apron K with the driving-wheel. It will be seen that the raising and lowering of the reel will not affect the action of the driving mechanism, as the reel-support is fulcrumed on the shaft $i$, which is the center of the sprocket-wheel $w$. A lever, Y, is also fulcrumed on the shaft $i$, outside of the post $j$, said lever having a locking device connected with it. To the short end of this lever is pivoted one end of the link X, its other end being pivoted to the pole C, which is hinged at its back end to the frame of the machine.

By this arrangement the driver in his seat can rock the machine on its ground-wheels, and thus elevate or depress the front edge of the machine, and with it the cutting apparatus, which it carries.

The drawings show a sheaf-carrier and binding mechanism; but as they are not herein claimed no description thereof is necessary.

Having described my invention, I claim as new—

1. In a harvesting-machine, the combination of a cutting apparatus, fixed supports located at opposite ends of the cutting apparatus, pivoted levers mounted upon the fixed supports, a reel mounted upon said levers, and a flexible connection extending from the lower extremity of the inner lever around suitable sheaves secured to the supports and frame to the upper extremity of the outer lever, whereby a movement of the inner lever produces a corresponding movement of the outer lever, substantially as and for the purpose herein described.

2. In a harvesting-machine, the combination of the fixed supports located upon the platform at opposite ends of the cutting apparatus, a reel-driving shaft mounted upon the inner fixed support, a lever pivoted upon said driving-shaft, and a similar lever pivoted upon the outer support in alignment with the said driving-shaft, a reel mounted upon said levers, and a flexible connection extending from the lower end of the inner lever around suitable sheaves secured to the supports and frame, and thence to the upper end of the outer lever, substantially as set forth.

3. In a harvesting-machine, fixed supports secured upon the platform at opposite ends of the cutting apparatus, a toothed sector secured to the inner fixed support, levers mounted pivotally upon said supports, a locking-dog attached to the inner lever within reach of the driver and engaging with said sector, a reel mounted upon said levers, and a flexible connection extending from the lower end of the inner lever to the upper end of the outer lever, and passing around suitable sheaves secured to the supports and frame, substantially as herein described.

4. In a harvesting-machine, the combination of the wheeled frame composed of the platform and vertical portions, fixed supports mounted upon the platform at opposite ends of the cutting apparatus, a reel-driving shaft carrying a sprocket-wheel and mounted upon the vertical frame portion and the inner fixed support, levers pivoted upon said support in the same axial line with the driving-shaft, a sprocket-wheel on the inner end of the reel-shaft, an endless driving-chain connecting said sprocket-wheels, and a flexible connection extending from the lower end of the inner lever to the upper end of the outer lever, and around suitable sheaves secured to the supports and vertical frame portions, substantially as set forth.

In testimony whereof I have hereunto set my hand this 6th day of November, A. D. 1882.

HENRY J. CASE.

Witnesses:
FRANK R. RATHBUN,
E. L. FINN.